(No Model.)  3 Sheets—Sheet 1.
T. C. COYKENDALL.
SYSTEM OF ELECTRICAL DISTRIBUTION.
No. 525,446.   Patented Sept. 4, 1894.
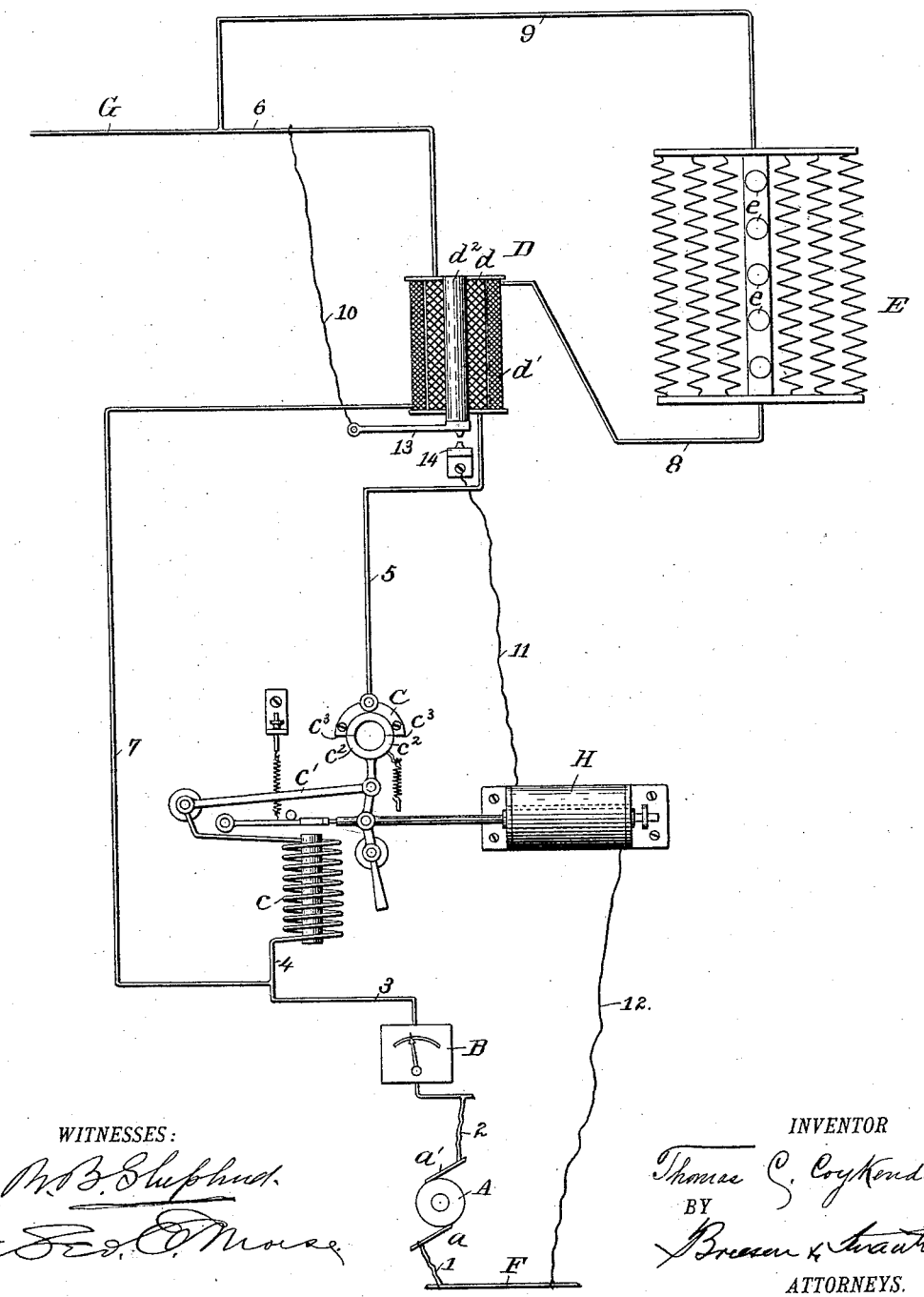

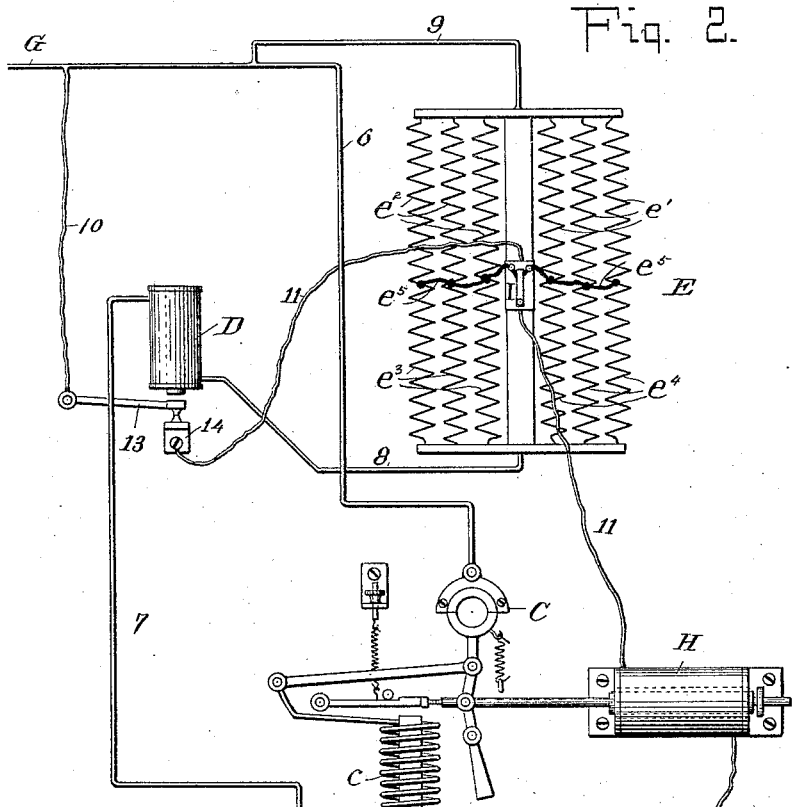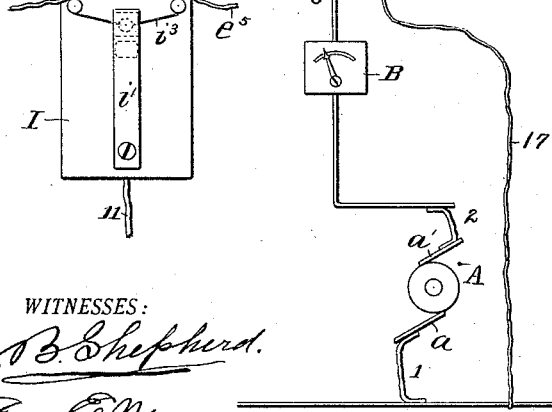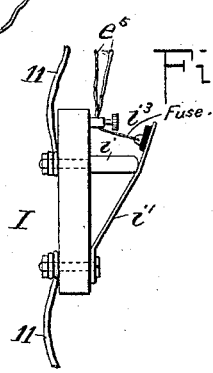

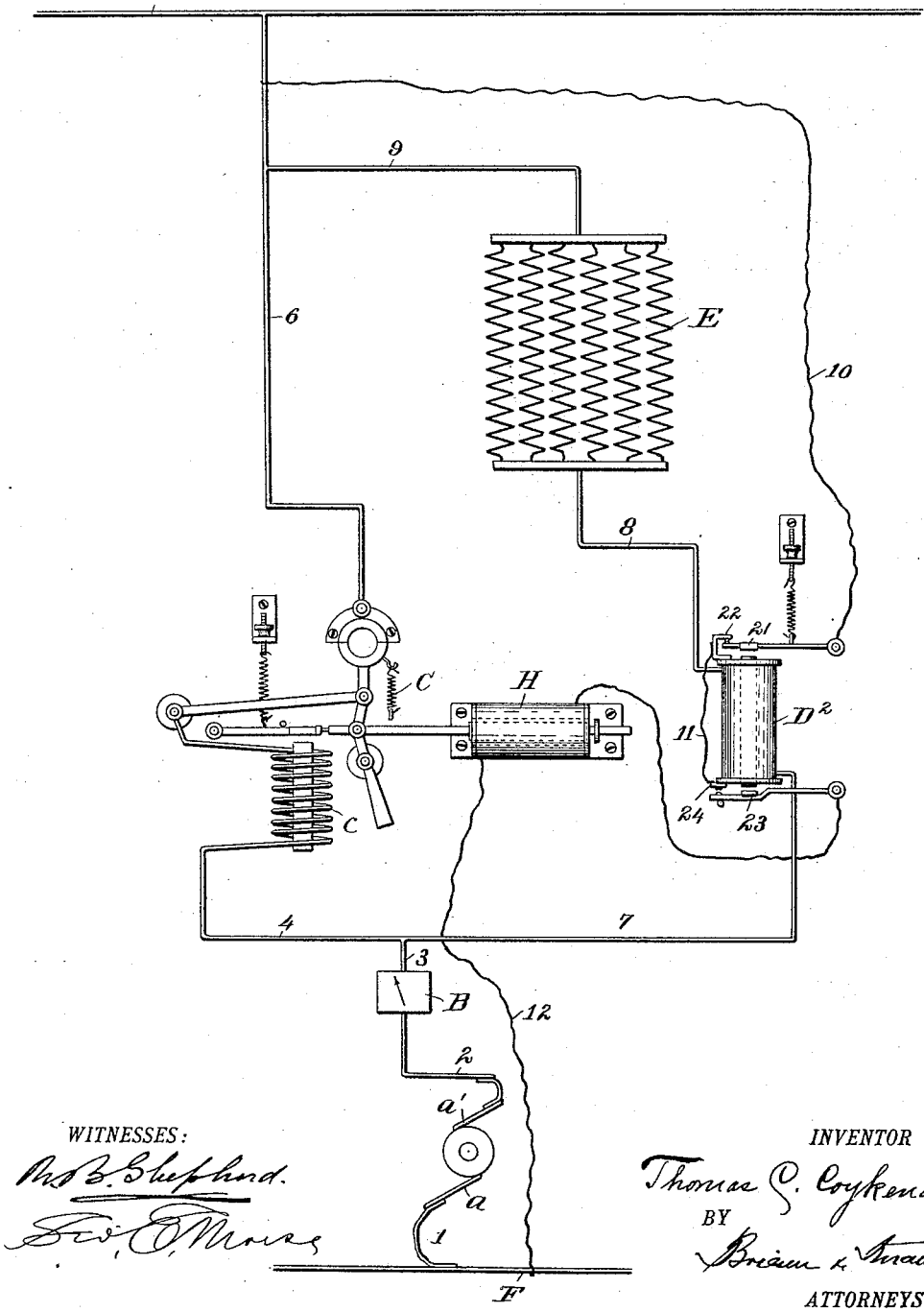

UNITED STATES PATENT OFFICE.

THOMAS C. COYKENDALL, OF RONDOUT, NEW YORK.

SYSTEM OF ELECTRICAL DISTRIBUTION.

SPECIFICATION forming part of Letters Patent No. 525,446, dated September 4, 1894.

Application filed January 18, 1894. Serial No. 497,224. (No model.)

*To all whom it may concern:*

Be it known that I, THOMAS C. COYKENDALL, a resident of Rondout, Ulster county, and State of New York, have invented certain new and useful Improvements in Systems of Electrical Distribution, of which the following is a specification.

My invention relates to systems of electrical distribution, and has for its object to provide an automatic device for returning the break-switch in a system of electrical distribution when the same has been opened by a ground or other fault on line, and to maintain the same open until the ground has been broken, or the fault remedied, so that the machine may be safely thrown in to feed the line.

To this end my invention consists in providing a high resistance path to line preferably in the form of a shunt around the break-switch, and controlling the device for restoring the break-switch by means of the current flowing in this high-resistance path.

A further object of my invention is to render the operation of the above described devices safe and certain.

In the drawings forming part hereof,—Figure 1 is a diagrammatic view of a system of distribution embodying one form of my invention. Fig. 2 is a diagrammatic view of a modification. Figs. 3 and 4 are plan and side views respectively of a detail to be described. Fig. 5 is a diagrammatic view of the preferred form of my invention.

In the drawings forming part hereof and referring for the present to Fig. 1, A is a dynamo electric machine or other source of electrical energy. B is an ammeter or other suitable current indicator in circuit therewith.

C is the break-switch or circuit-breaker of the system.

D is a magnet of a construction presently to be described.

E is a resistance which may be of any suitable character, and H is a magnet for restoring the break-switch hereinafter called the restoring magnet.

The dynamo A or other source of energy is connected to the main F, through brush $a$ and wire 1. The other pole of the source of energy is connected through brush $a'$, wire 2, indicator B, wires 3 and 4, coil $c$ of the break-switch, arm $c'$, and contacts $c^2$ $c^3$ thereof, wire 5, coil $d$ of magnet D (more fully hereinafter described), wire 6, to the main G. In addition to the path thus described, I provide a high resistance path to line, preferably arranged as shown, as a shunt around the break-switch, by wire 7, coil $d'$ of magnet D, wire 8, resistance E, and wire 9, to the main G. Included in this path, as above set forth and shown in Fig. 1 is the compound-wound magnet D consisting of coils $d$ and $d'$, and core $d^2$. The coil $d$ is included in circuit with the break-switch and is composed of a few turns of large wire. The coil $d'$ is included in the high resistance path to line, and is composed of a comparatively large number of turns of fine wire. The function of this compound-wound magnet will be more fully set forth hereinafter.

The resistance E may be of any suitable material or construction and has preferably included in its circuit one or more lamps $e$ $e$ for a purpose hereinafter set forth.

The restoring magnet H is of any suitable or ordinary construction and is preferably connected in circuit with the mains, as shown, by wires 10, 11, 12 in such a manner that when the break-switch is open, the high resistance path forms part of the circuit of the said magnet H. The circuit of this magnet may be traced as follows: From the machine, by brush $a'$, wire 2, indicator B, wires 3, 4 and 7, coil $d'$, of magnet D, wire 8, resistance E, wires 9 and 6, wire 10, armature 13, contact 14 (when the same are in engagement), wire 11, magnet H, and wire 12, main F, wire 1, and brush $a$ to the machine. By connecting the restoring magnet H in this manner, the high resistance path will form part of the circuit of the said magnet when the break-switch is out. Hence, if the high resistance path has become broken and the magnet D has no power to hold up its armature, and the same falls, the circuit of the restoring magnet will not be thereby completed as the circuit is broken in the high resistance path.

Having described the several parts of the form of my invention shown in Fig. 1 and their connections, I will now proceed to describe the detailed operation thereof in order to render the same more clear.

Current comes from the source A and passes to the main G through the two paths previously described. The high resistance path will take very little current. The current passing in the magnet D will hold the armature 13 away from its stop 14. Suppose, now, that a ground comes on the line. The break-switch C will go out, as is well understood, and the only path to line will be through the high resistance path before described. This path is of such high resistance that only a small amount of current will be allowed to pass, and there will be no danger of damage to the machine. As long as there is a ground or other analogous trouble on line, the current will continue to pass and the current passing through the coil $d'$ will be quite sufficient to hold up the armature 13 and keep the circuit of the restoring magnet open. This current will be sufficient to raise the lamp or lamps $e\ e$ to incandescence which will serve as a visual indicator of the flow of current therethrough. As soon as the ground or other trouble is removed, the current flowing will drop to zero or at least to a quantity corresponding to the slight leakage of the circuit, and the lamp or lamps will lose their brilliancy. As soon as the current in the high resistance path is cut down, as above set forth, the magnet D will allow its armature 13 to drop, thus completing the circuit of the restoring magnet H. This has the effect of energizing the magnet H, which thereupon restores the break-switch. It will thus be seen that as long as there is a ground or other trouble on the line, the break-switch will remain open, but as soon as the ground is broken, and it becomes safe to throw in the break-switch, the same will be done automatically.

In the modification shown in Fig. 2, A is the source of current connected as before to main F, through brush $a$, and wire 1, and to main G, through brush $a'$, wire 2, indicator B, wire 3, wire 4, break-switch C, and wire 6. The high resistance path is by way of wire 7, magnet $D'$, wire 8, resistance E, and wire 9. The circuit of the restoring magnet H is connected across the mains by way of wire 10, armature 13, contact 14, wire 11, in which is included an electro-responsive device I, presently to be described, magnet H, wire 12, armature 15, contact 16, and wire 17. The magnet $D'$ may be of any ordinary construction and is so wound and proportioned as to attract its armature when a small volume of current is flowing therein. Normally, that is to say, when the break-switch is in circuit, the current passing in the high resistance path is not sufficient to cause the magnet $D'$ to attract its armature, but when the break-switch goes out, and the entire current passing to the line, traverses the high resistance path, the magnet $D'$ attracts its armature. The armature 15 is controlled by the magnet $c$ of the break-switch C. The armature is held up from its stop 16 as long as current flows in the magnet $c$.

The detailed operation of the modification shown in Fig. 2 is as follows: The parts are shown in the figure in their normal position. When, now, a ground comes on the line, the break-switch goes out, as is well understood, and the circuit of the coil $c$ being thereby broken, the armature 15 falls upon its stop 16, at the same time the magnet $D'$ receiving an augmented current, draws up its armature 13. As soon as the ground on the line is removed, the current in the high resistance path and line drops, and the magnet $D'$ releases its armature, which falling, completes the circuit of the restoring magnet H, which thereupon restores the break-switch to its normal position.

It may sometimes happen that the resistance E may become damaged, and will consequently oppose a higher resistance to the passage of the current than was intended. This will have the effect of cutting down the current in the high resistance path when the break-switch is out, which, in some cases, will not be sufficient to enable the magnet $D'$ to hold up this armature, and the armature falling will cause the break-switch to be thrown in before the ground is removed from the line, which would defeat the very object of the invention. This difficulty I obviate in the following manner: I arrange the resistance E in the form of a Wheatstone bridge, as shown, $e'$, $e^2$, $e^3$ and $e^4$ being the four members thereof, and $e^5$ the bridge wire. In this bridge wire I arrange a suitable electro-responsive device as I, which is made to control the circuit of the restoring magnet. I may use any suitable electro-responsive device, the one shown herein consisting of a fixed terminal $i$ with which co-operates a spring terminal $i'$, which terminals are in the circuit of wire 11. The spring terminal $i'$ is held against the fixed terminal under tension, by a fuse wire $i^3$, which is included in the circuit of the bridge wire $e^5$. If, now, any of the members $e'$, $e^2$, $e^3$, $e^4$, of the Wheatstone bridge become injured or broken, current will be sent through the bridge wire $e^5$ and the fuse wire $i^3$ will be burned out, and will release the spring terminal $i'$, which will spring away from the fixed terminal $i$ and break the circuit of the restoring magnet so that the latter cannot be actuated to throw in the break-switch. It will now be necessary to throw in the break-switch by hand.

In the modification shown in Fig. 5, the source of electrical energy A is connected with the main F, through brush $a$, and wire 1, and with the main G, through brush $a'$, wire 2, indicator B, wire 3, wire 4, break-switch C, and wire 6. The high resistance path is through wire 7, magnet $D^2$, wire 8, resistance E, and wire 9.

The circuit of the restoring magnet H is completed from main to main through wires 10, 11 and 12. In the circuit of the restoring magnet H are the armatures 21 and 23 which co-operate with stops 22 and 24. These armatures are under the control of the magnet $D^2$ which may be of any ordinary construction. The armature 23 is so adjusted (by springs or weights) as to remain away from its contact 24, when the normal current is flowing through the magnet, that is to say, when the break-switch is in circuit, and to be attracted when a greater current flows. The armature 21 is so adjusted as to remain against its contact 22, when the normal current flows in the magnet, and to be attracted by the magnet when an abnormal current flows; that is to say, when the break-switch is out.

The general operation of this preferred form of my invention is similar to that of the other forms, but for the purpose of illustration and to more clearly explain the invention, we will suppose that a current of less quantity than one ampère will be insufficient to cause the magnet $D^2$ to attract the armature 23, and a current of less than 25 ampères will be insufficient to cause the magnet $D^2$ to attract the armature 21. We will likewise assume that the high resistance path is so proportioned to the main circuit, that when the break-switch is in circuit the current through the high resistance path is less than one ampère, and consequently both armatures 21 and 23 will remain unattracted. Further, we will assume that when the break-switch goes out on account of a ground or other trouble on line the current flowing in the high resistance path will be in excess of 25 ampères, and both armatures will be attracted. So, therefore, during the normal operation (when the break-switch is in circuit) the armature 21 will rest against the stop 22 and the armature 23 will rest against its backstop 25, and the circuit of the magnet H will be broken at 23, 24, and the magnet H will not be energized. When, now, the break-switch goes out, the current flowing in the high resistance path will exceed twenty-five ampères, as before explained, and both armatures will be attracted by the magnet $D^2$. The circuit of the magnet H will, however, be broken at 21, 22. As the ground is gradually removed from the line or the trouble abated, the current in the high resistance path will gradually decrease in volume. As soon as the current decreases to less than twenty-five ampères, the armature 21 will be released by the magnet $D^2$, and will come against its stop 22, and complete the circuit of the restoring magnet H, and the break-switch will be restored. As soon as the break-switch is restored, the normal operation of the system will be resumed and a current of less than one ampère will flow in the high resistance path, and the magnet $D^2$ will release its other armature 23, and will break the circuit of the restoring magnet at 23—24, the parts resuming the position shown in Fig. 5, which is their position during the normal operation of the system.

I do not limit myself to the construction or the arrangement of devices as shown herein, as the arrangement and construction may be greatly varied without departing from the spirit of my invention.

Having described my invention, what I claim, and desire to secure by Letters Patent, is—

1. In a system of electrical distribution, the combination of a source of electric energy, mains leading therefrom, a high resistance path to line, a break-switch in the circuit of the mains and means for restoring the break-switch controlled by the flow of current in the high resistance path, substantially as described.

2. In a system of electrical distribution, the combination of a source of electrical energy, mains leading therefrom, a break-switch in the circuit of the mains, a high resistance path to line, a restoring magnet for the break-switch, and a magnet in the high resistance path for controlling the flow of current in the restoring magnet, substantially as described.

3. In a system of electrical distribution, the combination of a source of electric energy, mains leading therefrom, a break-switch in the circuit of the mains, a shunt around the break-switch, and means for restoring the break-switch controlled by the flow of current in the shunt.

4. In a system of electrical distribution, the combination of a source of electric energy, mains leading therefrom, a break-switch in the circuit, of the mains, a shunt around the break-switch, a restoring magnet for the break-switch, and means controlled by the flow of current in the shunt for actuating the restoring magnet, substantially as described.

5. In a system of electrical distribution, the combination of a source of electric energy, mains leading therefrom, a break-switch in the circuit of the mains, a shunt around the break-switch, a restoring magnet for the break-switch, and a magnet in the shunt circuit for controlling the flow of current in the restoring magnet, substantially as described.

6. In a system of electrical distribution, the combination of a source of electric energy, mains leading therefrom, a break-switch in the circuit of the mains, a shunt around the break-switch, a restoring magnet for the break-switch, and a circuit therefor, all connected and arranged so that when the break-switch is out the shunt will form a part of the circuit of the restoring magnet, substantially as described.

7. In a system of electrical distribution, the combination of a high resistance path to line, arranged in the form of a Wheatstone bridge, an electro-responsive device in the bridge wire thereof, a break-switch, and means for restoring the same, controlled by the said electro-responsive device, substantially as described.

8. In a system of electrical distribution, the combination of a source of electrical supply, mains leading therefrom, a break-switch in circuit therewith, a shunt around the break-switch, and electro-magnet in the shunt having two armatures, a restoring magnet for the break-switch, controlled by the conjoint action of the armatures of the magnet in the shunt, substantially as described.

9. In a system of electrical distribution, the combination of a source of electrical supply, mains leading therefrom, a break-switch in circuit therewith, a shunt around the break-switch, an electro-magnet in the shunt, having two armatures, a restoring magnet for the break-switch, controlled by the armatures of the magnet in the shunt, one of said armatures being constructed to respond to a current of small volume and to open the circuit of the restoring magnet, the other of said armatures being constructed to respond to a current of great volume, and to close the circuit of the restoring magnet when so attracted, substantially as shown and described.

THOMAS C. COYKENDALL.

Witnesses:
HARRY M. TURK,
GEO. E. MORSE.